(12) United States Patent
Allen et al.

(10) Patent No.: US 9,772,823 B2
(45) Date of Patent: *Sep. 26, 2017

(54) ALIGNING NATURAL LANGUAGE TO LINKING CODE SNIPPETS TO PERFORM A COMPLICATED TASK

(71) Applicant: International Business Machines Corporation, Armonk, NY (US)

(72) Inventors: Corville O. Allen, Morrisville, NC (US); Heather L. Duschl, Raleigh, NC (US); Marit L. Imsdahl, Morrisville, NC (US); Alexandra D. Markello, Fayetteville, NC (US); Dana L. Price, Surf City, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/860,908

(22) Filed: Sep. 22, 2015

(65) Prior Publication Data

US 2017/0060555 A1    Mar. 2, 2017

Related U.S. Application Data

(63) Continuation of application No. 14/836,029, filed on Aug. 26, 2015.

(51) Int. Cl.
*G06F 3/00* (2006.01)
*G06F 9/44* (2006.01)
*G06F 9/54* (2006.01)

(52) U.S. Cl.
CPC ............... *G06F 8/36* (2013.01); *G06F 8/34* (2013.01); *G06F 9/54* (2013.01)

(58) Field of Classification Search
CPC ......................................................... G06F 9/54
(Continued)

(56) References Cited

U.S. PATENT DOCUMENTS 6,311,150 B1 * 10/2001 Ramaswamy ...... G06F 17/2765
704/1
7,027,975 B1    4/2006 Pazandak et al.
(Continued)

FOREIGN PATENT DOCUMENTS

WO    2014008450 A1    1/2014

OTHER PUBLICATIONS

Genevieve, Generalized Hebbian Algorithm for Incremental Singular Value Decomposition in Natural Language Processing, 2006.*
(Continued)

*Primary Examiner* — Lechi Truong
(74) *Attorney, Agent, or Firm* — Terrile, Cannatti, Chambers & Holland, LLP; Stephen A. Terrile

(57) ABSTRACT

A method, system and computer-usable medium for linking a set of executable code snippets to perform a complicated task, comprising: decomposing a natural language statement into a plurality of decomposed natural language components; searching a repository of code snippets to identify code snippets corresponding to each of the decomposed natural language components; ordering execution of the code snippets based upon the plurality of decomposed natural language components; and, executing the code snippets in order of the natural language statement requests until a final outcome is achieved.

5 Claims, 5 Drawing Sheets

(58) Field of Classification Search
USPC .......................................................... 719/310
See application file for complete search history.

(56) References Cited

U.S. PATENT DOCUMENTS

| | | | |
|---|---|---|---|
| 7,765,097 | B1 | 7/2010 | Yu et al. |
| 8,589,869 | B2* | 11/2013 | Wolfram .................. G06F 8/30 707/723 |
| 9,015,730 | B1 | 4/2015 | Allen et al. |
| 9,058,319 | B2 | 6/2015 | Balchandran et al. |
| 2003/0046061 | A1 | 3/2003 | Preston et al. |
| 2004/0059736 | A1* | 3/2004 | Willse ..................... G06F 17/27 |
| 2005/0086048 | A1* | 4/2005 | Nakayama .............. G06F 17/27 704/4 |
| 2005/0262056 | A1 | 11/2005 | Hamzy et al. |
| 2006/0004703 | A1 | 1/2006 | Spivack et al. |
| 2006/0009962 | A1 | 1/2006 | Monk |
| 2007/0106497 | A1 | 5/2007 | Ramsey et al. |
| 2007/0124263 | A1* | 5/2007 | Katariya ........... G06F 17/30663 706/14 |
| 2013/0086589 | A1 | 4/2013 | Levien et al. |
| 2013/0124194 | A1 | 5/2013 | Nadal |
| 2014/0108418 | A1 | 4/2014 | Elbaum et al. |
| 2014/0180728 | A1 | 6/2014 | Biddle et al. |
| 2016/0042058 | A1 | 2/2016 | Nguyen |
| 2016/0140210 | A1 | 5/2016 | Pendyala et al. |

OTHER PUBLICATIONS

Tihomir Gvero et al, On Synthesizing Code from Free-Form Queries, infoscience.epfl.ch, 2014 http://infoscience.epfl.ch/record/201606/files/main.pdf.

R. High, "The Era of Cognitive Systems: An Inside Look at IBM Watson and How it Works," IBM Redbooks, 2012.

Yuan et al., "Watson and Healthcare," IBM developerWorks, 2011.

IBM, Journal of Research and Development, This is Watson, Introduction and Table of Contents, vol. 56, No. 3/4, May/Jul. 2012,http://ieeexplore.ieee.org/xpl/tocresult.jsp?reload=true&isnumber=6177717.

S. Wolfram, Programming with Natural Language is Actually Going to Work, Nov. 16, 2010 http://blog.wolfram.com/2010/11/16/programming-with-natural-language-is-actually-going-to-work/.

List of IBM Patents or Applications Treated as Related.

* cited by examiner

ALIGNING NATURAL LANGUAGE TO LINKING CODE SNIPPETS TO PERFORM A COMPLICATED TASK

This is a continuation of U.S. patent application Ser. No. 14/836,029, filed Aug. 26, 2015, entitled "Aligning Natural Language to Linking Code Snippets to Perform a Complicated Task," which is incorporated herein by reference in its entirety.

BACKGROUND OF THE INVENTION

Field of the Invention

The present invention relates in general to the field of computers and similar technologies, and in particular to software utilized in this field. Still more particularly, it relates to a method, system and computer-usable medium for analyzing and deducing criteria-related content for evaluation.

Description of the Related Art

Natural language processing (NLP) refers to the technology that allows computers to understand, or derive meaning from, human languages, be it spoken or written. In general, NLP systems determine meaning from text. The meaning, and potentially other information extracted from the text, can be provided to other systems. For example, an NLP system used for an airline can be trained to recognize user intentions such as making a reservation, canceling a reservation, checking the status of a flight, etc. from received text. The text provided to the NLP system as input can be obtained from a speech recognition system, keyboard entry, or some other mechanism. The NLP system determines the meaning of the text and typically provides the meaning, or user intention, to one or more other applications. The meaning can drive business logic, effectively triggering some programmatic function corresponding to the meaning. For example, responsive to a particular meaning, the business logic can initiate a function such as creating a reservation, canceling a reservation, etc.

One issue relating to NLP is when the text is associated with a relatively complicated task (i.e., a task which includes a plurality of discrete sub-tasks). For example, a user may wish to perform a complicated task, but not know how to write the software code to perform these tasks. In such a situation it would be desirable to provide an NLP system which, based upon a predetermined goal and a received set of text, can link a set of executable code snippets that are deducted from the natural language of the text to perform a more complicated task.

SUMMARY OF THE INVENTION

A method, system and computer-usable medium are disclosed for linking a set of executable code snippets that are deducted from natural language text sources, to perform a complicated task. For the purposes of this disclosure, a code snippet comprises executable code that executes on a processor and performs at least one discrete task. A code snippet may be executed in series or in parallel with other executable code. The set of code snippets are analyzed based on a predetermined goal.

More specifically, in certain embodiments, the invention includes a complex task analysis operation which analyzes content such as text utilizing natural language processing (NLP) to identify programmable tasks, identify code matching the programmable tasks and execute the code. For the purposes of this disclosure, a complex task comprises a desired task that can be performed using a computer executable algorithm where the computer executable algorithm is comprised of a plurality of code snippets. In various embodiments, the complex task analysis operation includes applying natural language processing (NLP) to content [e.g., a document or other content source] to form a series of operational descriptions D1, D2, . . . Dn, wherein for each Di there is an input Ii, an output Oi, and an operational description Di mapping the Ii to the Oi; searching a repository for a code segment (Ci) [implementation] of each Di to form an executable Ei; converting the series of Di into the series of Ei; aligning and converting the output Oi to subsequent snippet input Ii+1 of executable Ei+1; and executing the Ei in sequential order (E1, E2, . . . En) to implement the series of operational descriptions in the content. Additionally, in various embodiments, the complex task analysis operation includes mapping each Di to a programming construct comprising terms, data types, and verbs; matching the data types to a programming language to determine parameters; and applying a similarity algorithm to identify the code segment Ci in the repository. Additionally, in various embodiments, the complex task analysis operation includes providing an artificial intelligence (AI) [e.g., machine language (ML)] component with user assistance to the similarity operation.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
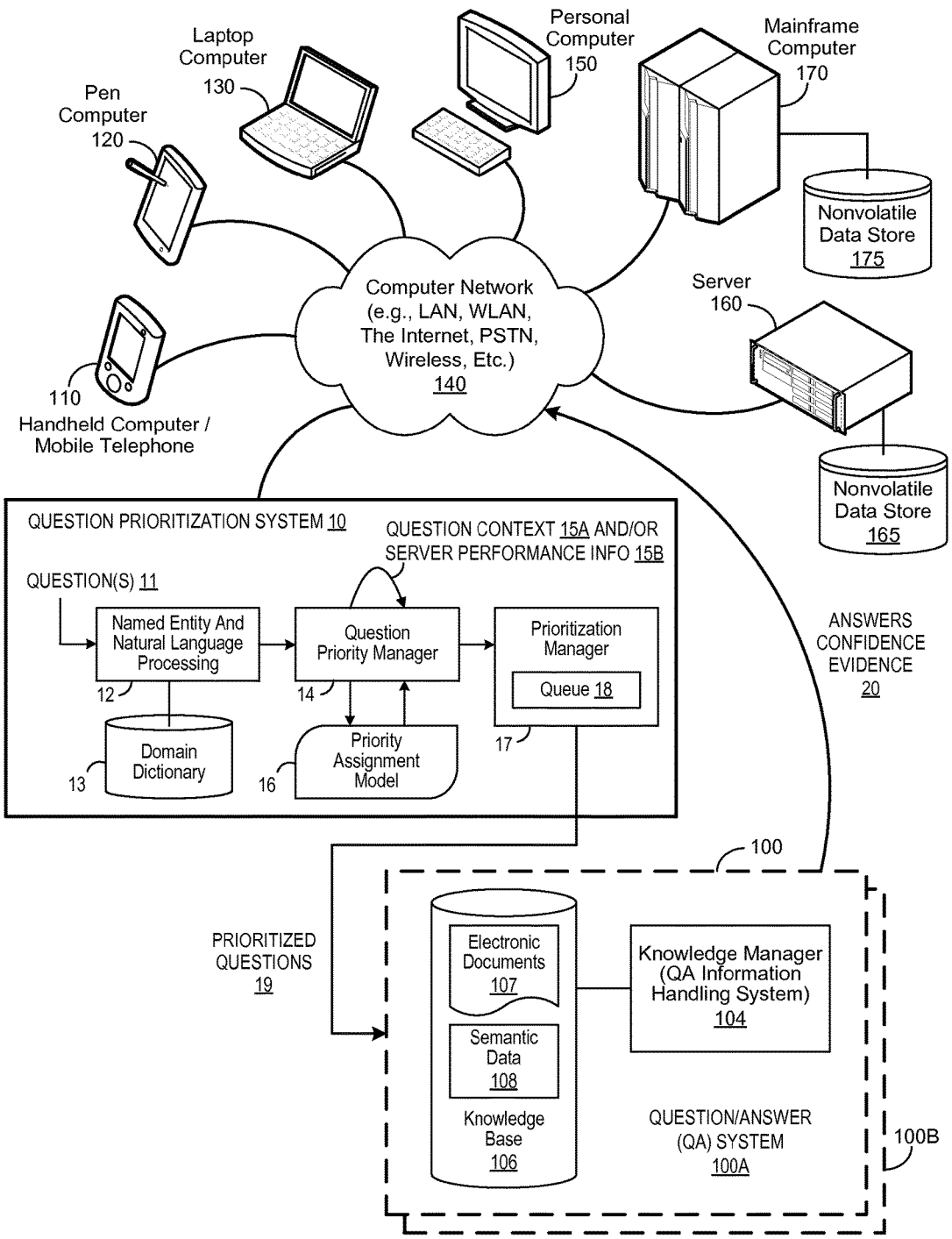
FIG. 1 depicts an exemplary client computer in which the present invention may be implemented.

A method, system and computer-usable medium are disclosed for performing a complex task analysis operation.

In certain embodiments, the complex task analysis operation receives a set of natural language statements, breaks the statements apart into simple steps, and matches these steps to a related set of correlatable executable code snippets, and then executes the set of code snippets in the correct order to accomplish the goal of the natural language statement. Additionally, the natural language statements are correlated with the functionality of the code snippets, the input(s) and output(s) of the snippets, and the ordering of the snippets by way of matching the code snippets to the subsequent snippets to execute a chain of snippets to reach a final outcome.

The complex task analysis operation identifies terms that map to operations or sets of operations for a code snippet, and terms that describe types of input (parameters) for methods in a programming language snippet. Additionally, the complex task analysis operation orders the execution of valid snippets that match the type and creates an on-demand parameters list from both NLP statements and output of a previous snippet. Additionally, the complex task analysis operation matches and alters the configuration for input/output for any of a plurality of programming language types.

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question prioritization system 10 and Question Answering (QA) system 100 connected to a computer network 140. The QA system 100 includes a knowledge manager 104 that is connected to a knowledge base 106 and configured to provide Question Answering (QA) generation functionality for one or more content users who submit questions across the network 140 to the QA system 100. To assist with efficient sorting and presentation of questions to the QA system 100, the prioritization system 10 may be connected to the computer network 140 to receive user questions, and may include a plurality of subsystems which interact with cognitive systems, like the knowledge manager 100, to prioritize questions or requests being submitted to the knowledge manager 100.

The Named Entity subsystem 12 receives and processes each question 11 by using Natural Language (NL) processing to analyze each question and extract question topic information contained in the question, such as named entities, phrases, urgent terms, and/or other specified terms which are stored in one or more domain entity dictionaries 13. By leveraging a plurality of pluggable domain dictionaries relating to different domains or areas (e.g., travel, healthcare, electronics, game shows, financial services), the domain dictionary 11 enables critical and urgent words (e.g., "account balance") from different domains (e.g., "banking") to be identified in each question based on their presence in the domain dictionary 11. To this end, the Named Entity subsystem 12 may use a Natural Language Processing (NLP) routine to identify the question topic information in each question. As used herein, "NLP" refers to the field of computer science, artificial intelligence, and linguistics concerned with the interactions between computers and human (natural) languages. In this context, NLP is related to the area of human-computer interaction and natural language understanding by computer systems that enable computer systems to derive meaning from human or natural language input. For example, NLP can be used to derive meaning from a human-oriented question such as, "How can I calculate my bank balance?" and to identify specified terms, such as named entities, phrases, or urgent terms contained in the question. The process identifies key terms and attributes in the question and compares the identified terms to the stored terms in the domain dictionary 13.

The Question Priority Manager subsystem 14 performs additional processing on each question to extract question context information 15A. In addition or in the alternative, the Question Priority Manager subsystem 14 may also extract server performance information 15B for the question prioritization system 10 and/or QA system 100. In selected embodiments, the extracted question context information 15A may include data that identifies the user context and location when the question was submitted or received. For example, the extracted question context information 15A may include data that identifies the user who submitted the question (e.g., through login credentials), the device or computer which sent the question, the channel over which the question was submitted, the location of the user or device that sent the question, any special interest location indicator (e.g., hospital, public-safety answering point, etc.), or other context-related data for the question. The Question Priority Manager subsystem 14 may also determine or extract selected server performance data 15B for the processing of each question. In selected embodiments, the server performance information 15B may include operational metric data relating to the available processing resources at the question prioritization system 10 and/or QA system 100, such as operational or run-time data, CPU utilization data, available disk space data, bandwidth utilization data, etc. As part of the extracted information 15A/B, the Question Priority Manager subsystem 14 may identify the SLA or QoS processing requirements that apply to the question being analyzed, the history of analysis and feedback for the question or submitting user, and the like. Using the question topic information and extracted question context and/or server performance information, the Question Priority Manager subsystem 14 is configured to populate feature values for the Priority Assignment Model 16 which provides a machine learning predictive model for generating a target priority values for the question, such as by using an artificial intelligence (AI) rule-based logic to determine and assign a question urgency value to each question for purposes of prioritizing the response processing of each question by the QA system 100.

The Prioritization Manager subsystem 17 performs additional sort or rank processing to organize the received questions based on at least the associated target priority values such that high priority questions are put to the front of a prioritized question queue 18 for output as prioritized questions 19. In the question queue 18 of the Prioritization Manager subsystem 17, the highest priority question is placed at the front for delivery to the assigned QA system 100. In selected embodiments, the prioritized questions 19 from the Prioritization Manager subsystem 17 that have a specified target priority value may be assigned to a specific pipeline (e.g., QA System 100A) in the QA system cluster 100. As will be appreciated, the Prioritization Manager subsystem 17 may use the question queue 18 as a message queue to provide an asynchronous communications protocol for delivering prioritized questions 19 to the QA system 100 such that the Prioritization Manager subsystem 17 and QA system 100 do not need to interact with a question queue 18 at the same time by storing prioritized questions in the question queue 18 until the QA system 100 retrieves them. In this way, a wider asynchronous network supports the passing of prioritized questions as messages between different computer systems 100A, 100B, connecting multiple applications and multiple operating systems. Messages can also be passed from queue to queue in order for a message to reach the ultimate desired recipient. An example of a commercial implementation of such messaging software is IBM's WebSphere MQ (previously MQ Series). In selected embodiments, the organizational function of the Prioritization Manager subsystem 17 may be configured to convert over-subscribing questions into asynchronous responses, even if they were asked in a synchronized fashion.

The QA system 100 may include one or more QA system pipelines 100A, 100B, each of which includes a computing device 104 (comprising one or more processors and one or more memories, and potentially any other computing device elements generally known in the art including buses, storage devices, communication interfaces, and the like) for processing questions received over the network 140 from one or more users at computing devices (e.g., 110, 120, 130) connected over the network 140 for communication with each other and with other devices or components via one or more wired and/or wireless data communication links, where each communication link may comprise one or more of wires, routers, switches, transmitters, receivers, or the like. In this networked arrangement, the QA system 100 and network 140 may enable Question Answering (QA) generation functionality for one or more content users. Other embodiments of QA system 100 may be used with components, systems, sub-systems, and/or devices other than those that are depicted herein.

In each QA system pipeline 100A, 100B, a prioritized question 19 is received and prioritized for processing to generate an answer 20. In sequence, prioritized questions 19 are de-queued from the shared question queue 18, from which they are de-queued by the pipeline instances for processing in priority order rather than insertion order. In selected embodiments, the question queue 18 may be implemented based on a "priority heap" data structure. During processing within a QA system pipeline (e.g., 100A), questions may be split into many subtasks which run concurrently. A single pipeline instance can process a number of questions concurrently, but only a certain number of subtasks. In addition, each QA system pipeline may include a prioritized queue (not shown) to manage the processing order of these subtasks, with the top-level priority corresponding to the time that the corresponding question started (earliest has highest priority). However, it will be appreciated that such internal prioritization within each QA system pipeline may be augmented by the external target priority values generated for each question by the Question Priority Manager subsystem 14 to take precedence or ranking priority over the question start time. In this way, more important or higher priority questions can "fast track" through the QA system pipeline if it is busy with already-running questions.

In the QA system 100, the knowledge manager 104 may be configured to receive inputs from various sources. For example, knowledge manager 104 may receive input from the question prioritization system 10, network 140, a knowledge base or corpus of electronic documents 106 or other data, a content creator 108, content users, and other possible sources of input. In selected embodiments, some or all of the inputs to knowledge manager 104 may be routed through the network 140 and/or the question prioritization system 10. The various computing devices (e.g., 110, 120, 130, 150, 160, 170) on the network 140 may include access points for content creators and content users. Some of the computing devices may include devices for a database storing the corpus of data as the body of information used by the knowledge manager 104 to generate answers to cases. The network 140 may include local network connections and remote connections in various embodiments, such that knowledge manager 104 may operate in environments of any size, including local and global, e.g., the Internet. Additionally, knowledge manager 104 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 104. The document 106 may include any file, text, article, or source of data (e.g., scholarly articles, encyclopedia references, textbooks, blogs, online courses of study and the like) for use in knowledge manager 104. Content users may access knowledge manager 104 via a network connection or an Internet connection to the network 140, and may input questions to knowledge manager 104 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 104 may interpret the question and provide a response to the content user containing one or more answers to the question. In some embodiments, knowledge manager 104 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input prioritized question 19 and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 100 then generates an output response or answer 20 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information processing systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information processing systems include pen, or tablet, computer 120, laptop, or notebook, computer 130, personal computer system 150, and server 160. As shown, the various information processing systems can be networked together using computer network 140. Types of computer network 140 that can be used to interconnect the various information processing systems include Local Area Networks (LANs), Wireless Local Area Networks (WLANs), the Internet, the Public Switched Telephone Network (PSTN), other wireless networks, and any other network topology that can be used to interconnect the information processing systems. Many of the information processing systems include nonvolatile data stores, such as hard drives and/or nonvolatile memory. Some of the information processing systems may use separate nonvolatile data stores (e.g., server 160 utilizes nonvolatile data store 165, and mainframe computer 170 utilizes nonvolatile data store 175). The nonvolatile data store can be a component that is external to the various information processing systems or can be internal to one of the information processing systems. An illustrative example of an information processing system showing an exemplary processor and various components commonly accessed by the processor is shown in FIG. 2.

Figure 2:
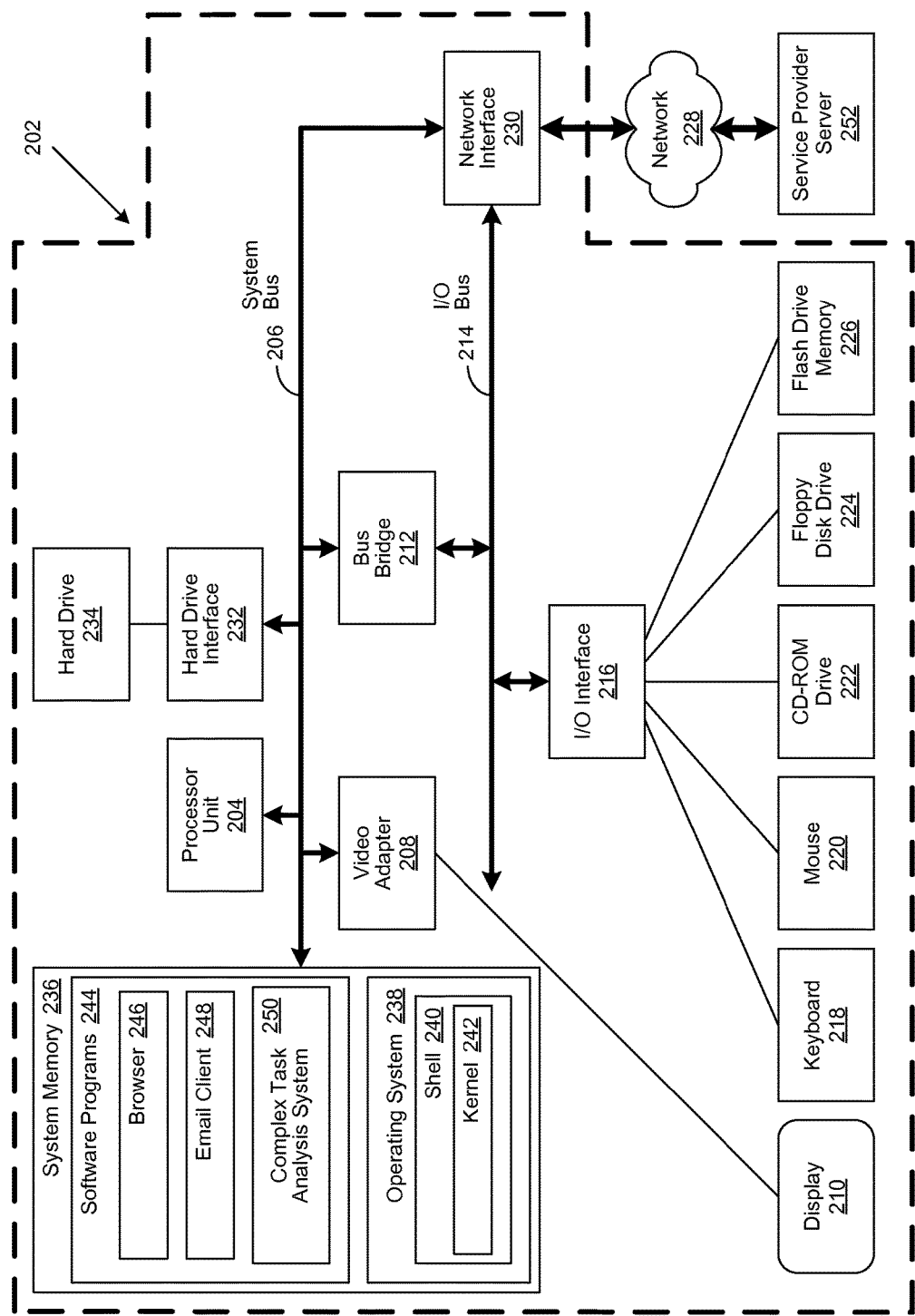
FIG. 2 is a simplified block diagram of an information handling system capable of performing computing operations.

FIG. 2 illustrates an information processing system 202, more particularly, a processor and common components, which is a simplified example of a computer system capable of performing the computing operations described herein. Information processing system 202 includes a processor unit 204 that is coupled to a system bus 206. A video adapter 208, which controls a display 210, is also coupled to system bus 206. System bus 206 is coupled via a bus bridge 212 to an Input/Output (I/O) bus 214. An I/O interface 216 is coupled to I/O bus 214. The I/O interface 216 affords communication with various I/O devices, including a keyboard 218, a mouse 220, a Compact Disk-Read Only Memory (CD-ROM) drive 222, a floppy disk drive 224, and a flash drive memory 226. The format of the ports connected to I/O interface 216 may be any known to those skilled in the art of computer architecture, including but not limited to Universal Serial Bus (USB) ports.

The information processing system 202 is able to communicate with a service provider server 252 via a network 228 using a network interface 230, which is coupled to system bus 206. Network 228 may be an external network such as the Internet, or an internal network such as an Ethernet Network or a Virtual Private Network (VPN). Using network 228, client computer 202 is able to use the present invention to access service provider server 252.

A hard drive interface 232 is also coupled to system bus 206. Hard drive interface 232 interfaces with a hard drive 234. In a preferred embodiment, hard drive 234 populates a system memory 236, which is also coupled to system bus 206. Data that populates system memory 236 includes the information processing system's 202 operating system (OS) 238 and software programs 244.

OS 238 includes a shell 240 for providing transparent user access to resources such as software programs 244. Generally, shell 240 is a program that provides an interpreter and an interface between the user and the operating system. More specifically, shell 240 executes commands that are entered into a command line user interface or from a file. Thus, shell 240 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 242) for processing. While shell 240 generally is a text-based, line-oriented user interface, the present invention can also support other user interface modes, such as graphical, voice, gestural, etc.

As depicted, OS 238 also includes kernel 242, which includes lower levels of functionality for OS 238, including essential services required by other parts of OS 238 and software programs 244, including memory management, process and task management, disk management, and mouse and keyboard management. Software programs 244 may include a browser 246 and email client 248. Browser 246 includes program modules and instructions enabling a World Wide Web (WWW) client (i.e., information processing system 202) to send and receive network messages to the Internet using HyperText Transfer Protocol (HTTP) messaging, thus enabling communication with service provider server 252. In various embodiments, software programs 244 may also include a complex task analysis system 250. In these and other embodiments, the complex task analysis system 250 includes code for implementing the processes described hereinbelow. In one embodiment, information processing system 202 is able to download the complex task analysis system 250 from a service provider server 252.

The complex task analysis system 250 performs a complex task analysis operation during which each sentence or complete phrase in the natural language text is analyzed for verbs that correlate to actions in matching code snippets. The statements are analyzed for variables and values that would be inputs or outputs to a particular code snippet. Both the natural language based inputs and the previous snippet outputs are then used to determine follow up snippets that may be applicable for the next step of execution. All code snippet sets are executed in order of the natural language statement requests until a final outcome is achieved.

In some embodiments when a code snippet requires an additional parameter that is not specified as an output of the previous code snippet, a default instance of that parameter is generated that matches the signature. For example, a file is given a generic file name and default configured location if a file name and/or configuration location is not specified.

The hardware elements depicted in the information processing system 202 are not intended to be exhaustive, but rather are representative to highlight components used by the present invention. For instance, the information processing system 202 may include alternate memory storage devices such as magnetic cassettes, Digital Versatile Disks (DVDs), Bernoulli cartridges, and the like. These and other variations are intended to be within the spirit, scope and intent of the present invention.

Figure 3:
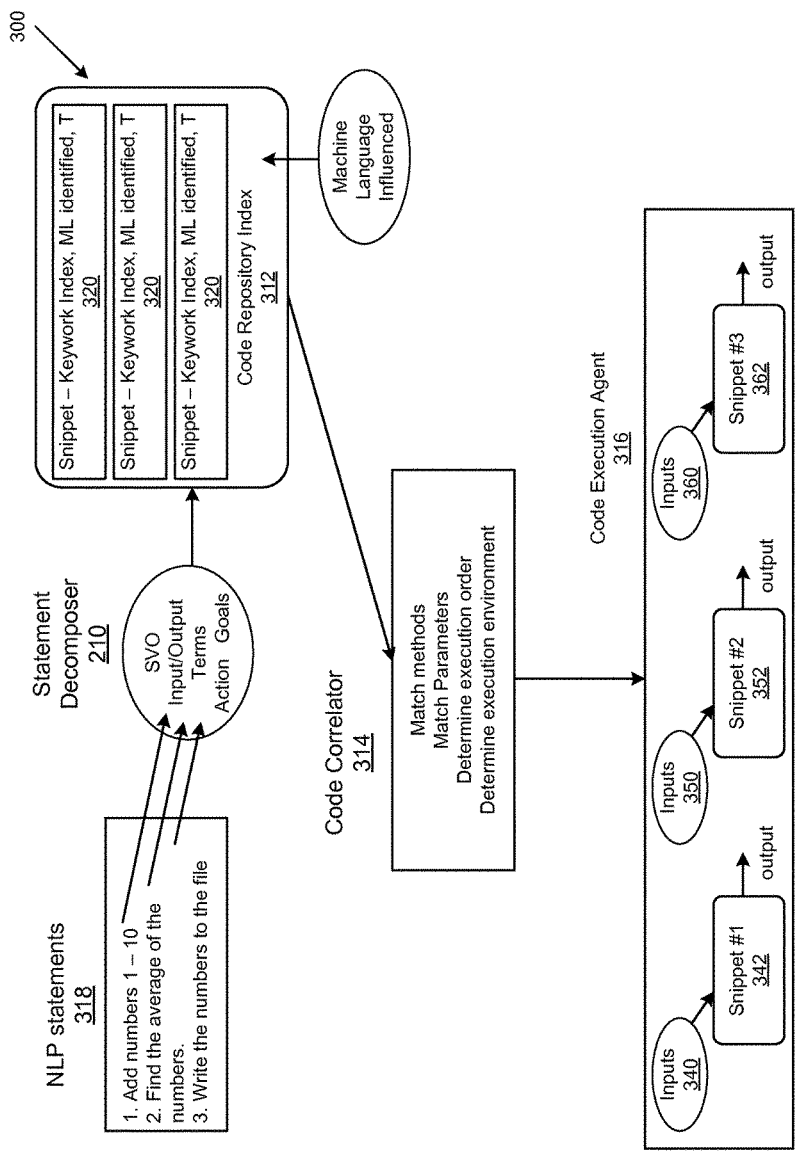
FIG. 3 is a generalized depiction of a complex task analysis operation.

Referring to FIG. 3, a block diagram of a complex task analysis system 300 is shown. In various embodiments, the complex task analysis operation may be performed as a hardware operation, a software operation, or a combination thereof. In certain embodiments, the complex task analysis system 300 includes some or all of the functions performed by the complex task analysis system 250.

The complex task analysis system 300 links a set of executable code snippets that are deducted from natural language, to perform a more complicated task. The set of code snippets are analyzed based on a predetermined goal. The complex task analysis system 300 includes a statement decomposer 310, a code repository index 312, a code correlator 314 and a code execution agent 316.

The statement decomposer 310 decomposes an NLP statement 318 into a plurality of statement components. In various embodiments, the statement components can be identified based upon a plurality of operations including a subject-verb-object (SVO) operation, a term identification operation, input/output identification operation, an action identification operation and a goal identification operation.

The code repository index 312 includes a plurality of code snippets 320, where each code snippet 320 includes an associated keyword index, machine learning (ML) identified and type (T). The associated keyword index, ML identified and T for each code snippet 320 is influenced by machine learning. The machine learning identified explores the construction and study of the algorithms contained within the code snippet. In certain embodiments, the machine learning indication is based upon a logistic regression operation which determines which of the set of subject verb objects or set of verbs that fall into a particular category of programming pattern. In various embodiments, the type provides an indication of a primary type of objects or classes that are identified in the respective code snippet. For example, the type may include an integer type, a person type or an account type.

The code correlator 316 correlates a statement component with a code snippet 320. In various embodiments, the code correlator 320 matches parameters, matches methods, determines an execution order and determines an execution environment.

The code execution agent 316 executes a plurality of code snippets based upon information provided by the code correlator 320 to perform a complex task. More specifically, the code execution agent 316 provides a first set of inputs 340 to a first code snippet (snippet #1) 342 and generates a first output. The code execution agent 316 provides a second set of inputs 350 to a second code snippet (snippet #2) 352 and generates a second output. The code execution agent 316 provides a third set of inputs 360 to a third code snippet (snippet #3) 362 and generates a third output. Some or all of the first, second and third inputs are derived from portions of the decomposed NLP statement components as well as some or all of a previous snippet output.

For example, the complex task analysis system 300 might receive the following statements: Add numbers from 1 through 10; Find the average of the numbers; and, Write the numbers to the file. The complex task analysis system 300 would then generate code to perform the complex task corresponding to these statements. The complex task analysis system analyzes the content such as text utilizing natural language processing (NLP) to identify programmable tasks, identify code matching the programmable tasks and execute the code.

In various embodiments, the statement decomposer 310 forms a series of operational descriptions D1, D2, . . . Dn, from the statements. For each operational descriptor Di there is an input Ii (e.g., the statement segment), an output Oi, and an operational description Di mapping the input Ii to the output Oi.

The complex task analysis system 300 performs a code similarity expansion operation using the code repository index 314. The code similarity expansion operation searches the repository for a code segment (Ci) (i.e., a code snippet) that represents the requirements for each Di to form an executable Ei. The code correlator 316 converts the series of Di to the series of Ei; aligns the code segments and variables and converts the output Oi to subsequent snippet input Ii of executable Ei. The code execution agent 316 executes the executables Ei (i.e., the code snippets) in sequential order (E1, E2, . . . En) to implement the series of operational descriptions in original statements.

Figure 4:
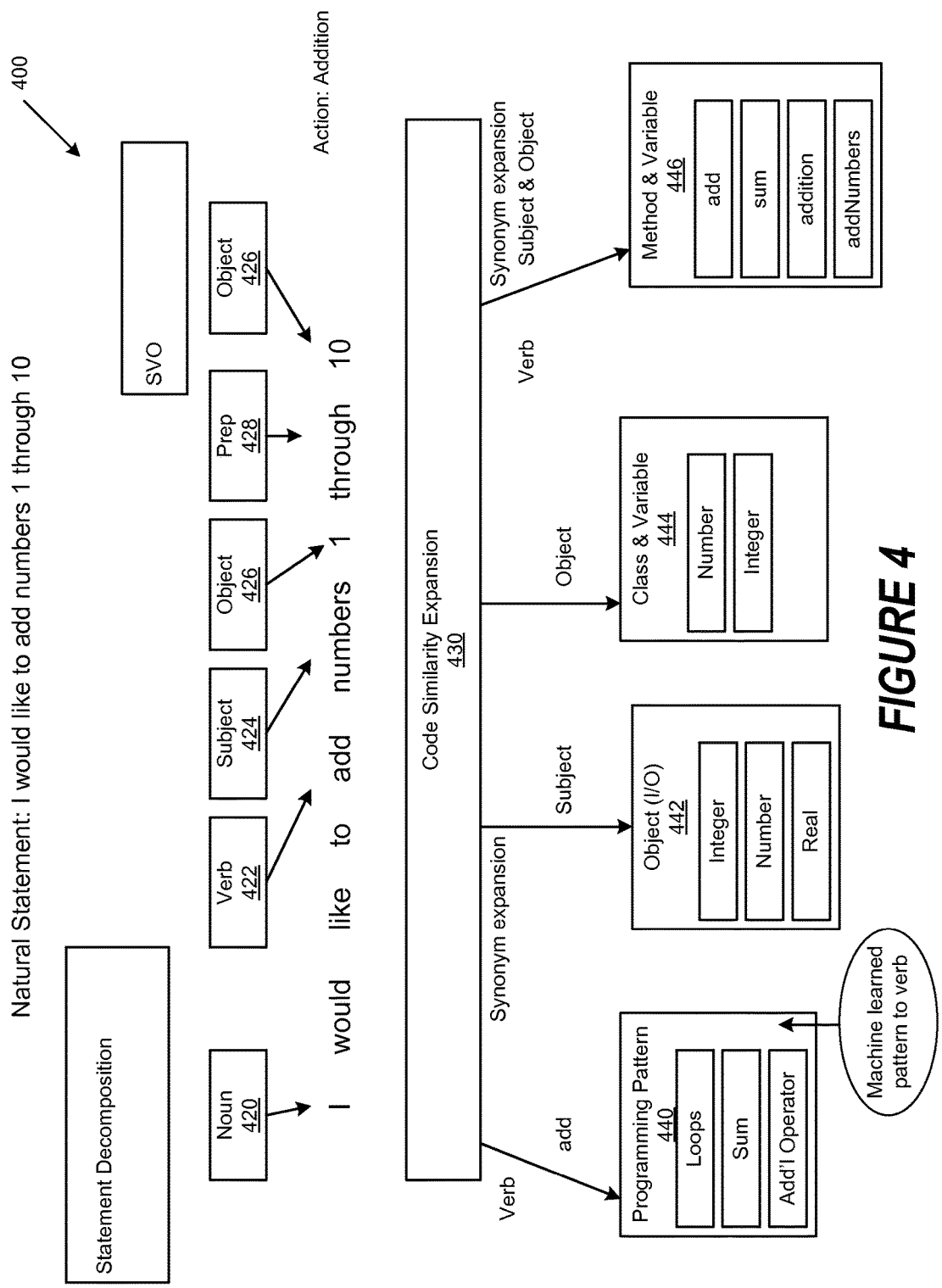
FIG. 4 shows a block diagram of a complex task analysis system.

FIG. 4 is a generalized depiction of a complex task analysis operation 400 implemented in accordance with an embodiment of the invention.

During the complex task analysis operation 400 each sentence or complete phrase in the natural language text is analyzed for actions, or verbs, that correlate to matching code snippets. The statements are also analyzed for variables and values that would be inputs to a particular code snippet. Both the natural language based inputs and the code snippet outputs are then used to determine follow up code snippets that may be applicable for the next step of execution. All code snippet sets are executed in order of the natural language statement requests until a final outcome is achieved.

For example, a natural language process (e.g., a statement decomposition process) is applied to the sentence "I would like to add numbers from 1 through 10." The natural language process can include performing a subject, verb, object analysis on the statement. The operational descriptions generated by the statement decomposition process can comprise some or all of a noun operational descriptor 420, a verb operational descriptor 422, a subject operational descriptor 424, an object operational descriptor 426 and a proposition operational descriptor 428.

Next, a code similarity expansion operation 430 is performed on the decomposed statements. Continuing the example using the example sentence, the code similarity expansion operation 430 identifies that certain portions of the decomposed statements correspond a programming pattern 440. In various embodiments, the programming pattern includes a loop operation, a sum operation and/or an addition operator operation. Machine learned patterns are applied to the verb to determine which type of operation to apply. The code similarity expansion operation 430 identifies that other portions of the decomposed statement correspond to an object 442 (e.g., is an input or an output). In various embodiments, the object includes e.g. an integer object, a number object and/or a real object.

The code similarity expansion operation 430 identifies that other portions of the decomposed statement correspond to a particular class and variables 444. In various embodiments, the class and variable includes e.g. a number class and/or an integer class.

The code similarity expansion operation 430 identifies that other portions of the decomposed statement correspond to a particular method and variables 446. In various embodiments, the method and variable includes e.g. an add method, a sum method, an addition method and/or an addNumbers method.

Skilled practitioners of the art will recognize that many such embodiments are possible and the foregoing is not intended to limit the spirit, scope or intent of the invention. Specifically, many other programming patterns, objects, classes and variables and methods and variables are contemplated.

Figure 5:
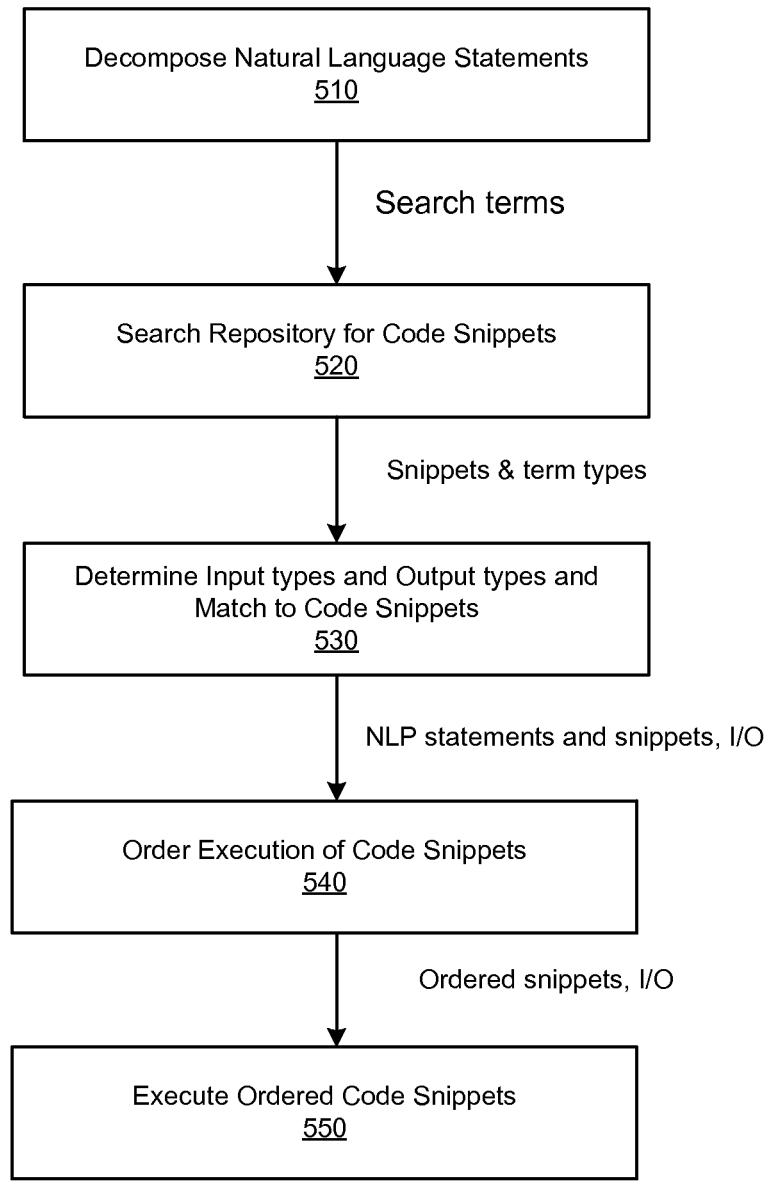
FIG. 5 shows a generalized flowchart of the complex task analysis operation.

Referring to FIG. 5, a generalized flowchart of the complex task analysis operation 500 is shown. More specifically, the complex task analysis operation 500 begins operation at step 510 by decomposing natural language statements. In various embodiments, decomposing natural language statements includes parsing NLP statements into terms, parts of speech and tokens. Next at step 520, the complex task analysis operation 500 searches a code repository using terms, types, verbs, etc. that were identified when decomposing the natural language statements.

Next at step 530, the complex task analysis operation 500 determines input types and output types from the decomposed natural language statements, and matches the input types and output types to code snippets. In certain embodiments, the matching includes matching data types to input types for code snippets, matching outcome types to output types or snippet statements, matching data types to a particular programming language of a code snippet and determining parameters to associate with the code snippet. Additionally, in certain embodiments, the matching includes locating similar statements that describe the code snippets and matching decomposed statement terms to terms and phrases in some syntactic position. Additionally, in certain embodiments, the matching includes verifying that objects and subjects conform to a data type of a particular method or operation. Additionally, in certain embodiments, the matching includes denoting sequences and lists of data types from natural language statements and mapping them to parameters.

Next at step 540, the complex task analysis operation 500 orders the sequence of the code snippets based on statement order and input and output type matching. Next, at step 550, the complex task analysis operation creates an execution environment for the code snippets and executes the ordered code snippets with the identified input parameters and retrieves a final output from the sequence of ordered code snippets.

Although the present invention has been described in detail, it should be understood that various changes, substitutions and alterations can be made hereto without departing from the spirit and scope of the invention as defined by the appended claims.

What is claimed is:

1. A computer-implemented method for linking a set of executable code snippets to perform a complicated task, comprising:

decomposing a natural language statement into a plurality of decomposed natural language components, the natural language statement relating to a complicated task, the complicated task comprising a plurality of sub-tasks, each of the plurality of sub-tasks corresponding to a respective decomposed natural language component, the decomposing comprising parsing the natural language statement into terms and parts of speech;

searching a repository of code snippets to identify code snippets corresponding to each of the plurality of sub-tasks corresponding to the respective decomposed natural language components; and, ordering execution of the code snippets based upon the sub-tasks corresponding to the plurality of decomposed natural language components, wherein each of the plurality of sub-tasks corresponding to respective decomposed natural language statement components are identified based upon a subject-verb-object (SVO) operation, a term identification operation, input/output identification operation, an action identification operation and a goal identification operation.

2. The method of claim 1, further comprising:

executing the code snippets in order of the natural language statement requests until a final outcome is achieved;

analyzing the plurality of decomposed natural language components for variables and values; and, associating any identified variables and values with a particular code snippet based upon the analysis.

3. The method of claim 2, wherein:

the associating includes matching data types to input types for code snippets, matching outcome types to output types, matching data types to a particular programming language of a code snippet and determining parameters to associate with the code snippet.

4. The method of claim 1, wherein:

natural language statement based inputs and code snippet outputs are used to determine follow up snippets that are applicable for a next step of execution.

5. The method of claim 1, wherein:

when a code snippet requires an additional parameter that is not specified within the natural language statement, a default instance of the additional parameter is generated that matches a signature within the repository of code snippets.

* * * * *